United States Patent [19]

Graver

[11] Patent Number: 5,001,970
[45] Date of Patent: Mar. 26, 1991

[54] GRILL EXHAUST SYSTEM

[76] Inventor: James H. Graver, 70 Sycamore Rd., Carmel, Ind. 46032

[21] Appl. No.: 565,694

[22] Filed: Aug. 13, 1990

Related U.S. Application Data

[63] Continuation-in-part of Ser. No. 417,835, Oct. 6, 1989, Pat. No. 4,962,694, which is a continuation-in-part of Ser. No. 182,255, Apr. 15, 1988, abandoned.

[51] Int. Cl.$^5$ .......................... A47J 37/00; A47J 37/06
[52] U.S. Cl. .......................................... 99/339; 99/446; 99/450; 126/21 A; 126/37 R; 126/300
[58] Field of Search .................. 99/339, 422, 444, 447, 99/375, 400, 401, 408, 425, 445, 446, 448, 450; 126/1 AE, 1 R, 21 R, 21 A, 76, 80, 83, 25 R, 41 R, 299 C, 299 D, 299 F, 39 BA, 39 N, 39 M, 39 E, 39 R

[56] References Cited

U.S. PATENT DOCUMENTS

| | | |
|---|---|---|
| 3,514,301 | 5/1970 | Berger . |
| 3,530,784 | 9/1970 | Courchesne ........................ 126/300 |
| 3,555,995 | 1/1971 | Berger ................................ 99/446 |
| 3,587,555 | 6/1971 | Cerola ............................ 126/21 A |
| 3,712,819 | 1/1973 | Field ............................... 126/21 A |
| 3,745,912 | 7/1973 | Field .................................. 99/446 |
| 3,797,375 | 3/1974 | Cerola . |
| 4,386,558 | 6/1983 | Holman et al. ................... 126/21 A |
| 4,402,300 | 9/1983 | Houck ................................. 99/400 |
| 4,648,378 | 3/1987 | Nishikawa ...................... 126/299 D |
| 4,736,729 | 4/1988 | Beach ................................. 126/300 |
| 4,862,795 | 9/1989 | Hawkins .............................. 99/446 |

Primary Examiner—Timothy F. Simone
Attorney, Agent, or Firm—Woodward, Emhardt, Naughton, Moriarty & McNett

[57] ABSTRACT

A cartridge for a grill exhaust system. A fan unit directs and exhausts a stream of fumes and particles created by cooking away from an apertured cooking surface and has a main frame defining an exhaust plenum, a support system for a flow diverger cartridge and a replaceable flow diverter cartridge insertable in the plenum below the cooking surface. A cartridge body has a flow diverter assembly within the cartridge body for inducing undulation in the exhaust stream so that the particles and liquids are separated from the stream and collected on the assembly while the fumes are directed downwardly from the cooking surface through the vents. A support system supports the cartridge when the cartridge is placed in the plenum so that the cartridge is demountable relative to the plenum.

17 Claims, 6 Drawing Sheets

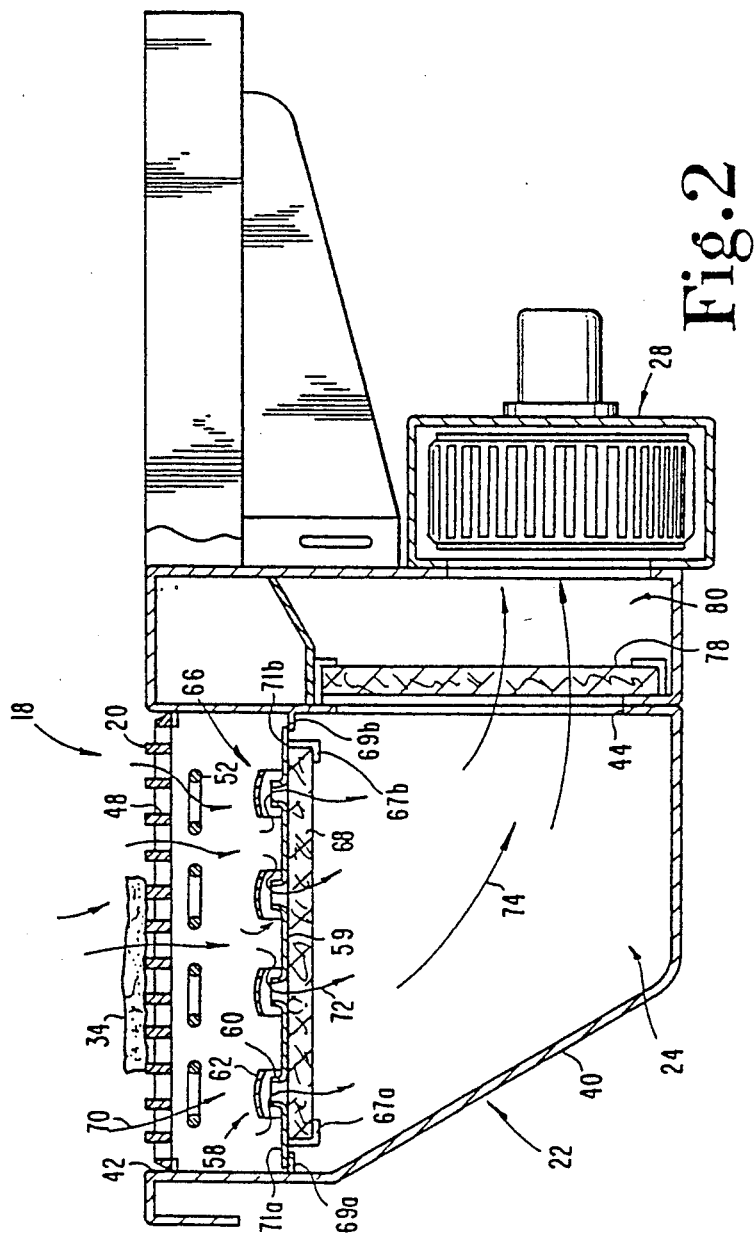

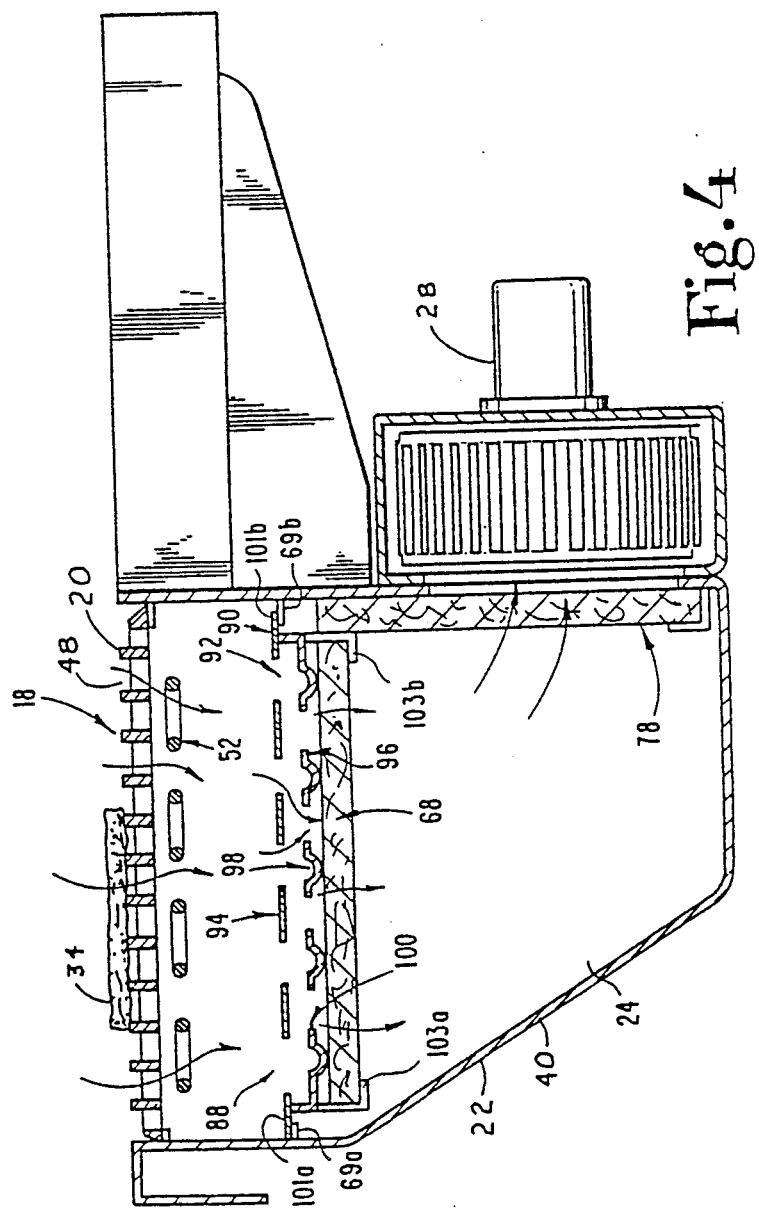

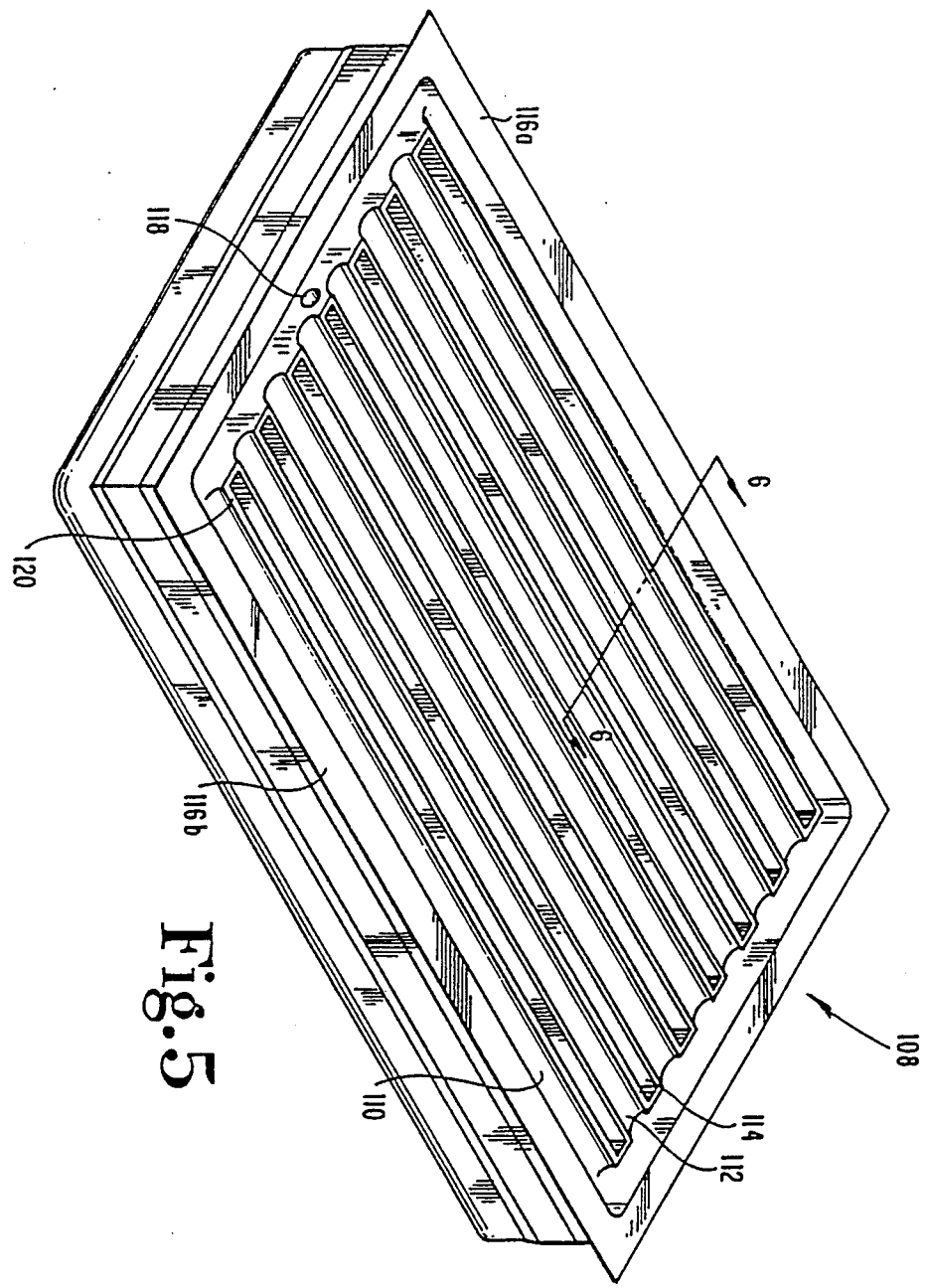

GRILL EXHAUST SYSTEM

REFERENCE TO RELATED APPLICATIONS

This application is a continuation-in-part of allowed U.S. application Ser. No. 417,835 filed Oct. 6, 1989 now U.S. Pat. No. 4,962,694 in turn a continuation-in-part of U.S. patent application Ser. No. 182,255, filed Apr. 15, 1988 and now abandoned.

BACKGROUND OF THE INVENTION

The present invention relates to an exhaust system for venting smoke and fumes away from an indoor grill unit. More particularly, the present invention relates to an exhaust system which draws the fumes and cooking gases downwardly away from the cooking surface before the fumes and cooking gases have been released to the atmosphere surrounding the cooking surface.

Conventional exhaust systems for venting cooking gases and fumes away from indoor grill units have generally been of the type which draw the fumes and cooking gases laterally over the top of the grill surface and then downwardly into a plenum chamber. In these exhaust systems, the cooking gases and fumes are permitted to rise upwardly away from the grill surface and then are drawn basically horizontally away from the grill surface and then downwardly into the plenum chamber.

An example of such an exhaust system for an indoor grill unit is disclosed in U.S. Pat. No. 3,797,375 to Cerola. Cerola '375 discloses a grill unit and an adjacent plenum chamber. A fan mounted in the plenum chamber draws cooking gases and fumes from above the grill surface into the plenum chamber to be discharged to the outside atmosphere. That air can be drawn laterally through side openings located in the grill element structure to provide cooling for the grill element is also disclosed. However, as in other conventional exhaust systems, the cooking fumes and gases generated by cooking on the grill surface are permitted to rise upwardly away from the grill surface before they are drawn laterally toward the plenum chamber. By permitting the cooking gases and fumes, as well as the grease, to rise upwardly away from the grill surface, a certain amount of the grease will inevitably settle onto the surface surrounding the grill unit. This is generally undesirable because of the necessity of cleaning the surrounding surfaces after the grill unit has been utilized.

Down draft exhaust systems for venting cooking gases and fumes have been proposed to solve the problems left unresolved by conventional horizontal exhaust systems. An example of such a system is that described in U.S. Pat. No. 3,514,301 to Berger. The Berger exhaust system further has a drawer in which is provided an exhaust diverter with a central opening having a cover thereover. The cover is slanted and extends well beyond the opening. This configuration separates solid drippings from the gases and fumes. The drawer containing the exhaust opening and its cover may be cleaned by sliding the drawer into its exposed position from the cooking unit. Cleaning of this type of exhaust system is not entirely efficient since the cover and opening are not designed for removal for soaking, placing in a dishwasher and the like. Further, it is unknown to provide a unitary diverter and filter assembly designed for efficient removal and replacement.

SUMMARY OF THE INVENTION

Accordingly, the present invention provides a grill exhaust system for directing and exhausting a stream of fumes and particles created by cooking away from an apertured cooking surface comprised of a main frame including a plurality of upwardly extending walls defining an exhaust plenum extending therebetween and a top opening for receiving the cooking surface. A removable and replaceable flow diverter cartridge insertable in the plenum below the cooking surface includes a cartridge body having sides and a flow diverter assembly. The flow diverter assembly is within the cartridge body for inducing undulation in the exhaust stream and includes at least two substantially parallel spaced-apart overlying plates. Each of the plates defines a plurality of exhaust vents wherein the exhaust vents are staggered relative to the exhaust vents in the substantially parallel plate therebelow and each immediately overlying plate defines a series of spaced covers for the exhaust vent immediately therebelow. The diverter assembly directs the stream downwardly from the cooking surface through the vents while inducing undulation so that the particles are separated from the stream and collect on the assembly while the fumes are exhausted therethrough. First supporting means provided on the cartridge body extend continuously through the length of the sides. Second supporting means are provided on the main frame for removably receiving the first supporting means as are access means for accessing the cartridge for removal from the frame. A fan unit is present for drawing the fumes downwardly through the apertured cooking surface.

It is one object of the present invention to provide an exhaust system for an indoor cooking grill unit which removes cooking gases and fumes, as well as grease, from the cooking surface before they are permitted to enter the atmosphere surrounding the grill surface.

Another object of the present invention is to provide an exhaust system for an indoor cooking grill unit which removes the cooking gases and fumes away from the cooking surface in the most efficient manner and by the most direct path from the cooking surface.

Yet another object of the present invention is to provide an exhaust system for an indoor cooking grill unit which aids in preventing grease created by cooking from splattering onto surfaces above and surrounding the cooking surface.

Yet another object of the present invention is to provide an exhaust system for an indoor cooking grill unit which draws the cooking gases and fumes downwardly away from the cooking surface into an exhaust chamber which is located substantially directly below the cooking surface.

A further object of the present invention is to provide an improved diverter cartridge assembly for a grill exhaust system.

Additional objects, features, and advantages of the invention will become apparent to those skilled in the art upon consideration of the following detailed descriptions of preferred embodiments exemplifying the best mode of carrying out the invention as presently perceived.

DETAILED DESCRIPTION OF THE DRAWINGS

Figure 1:
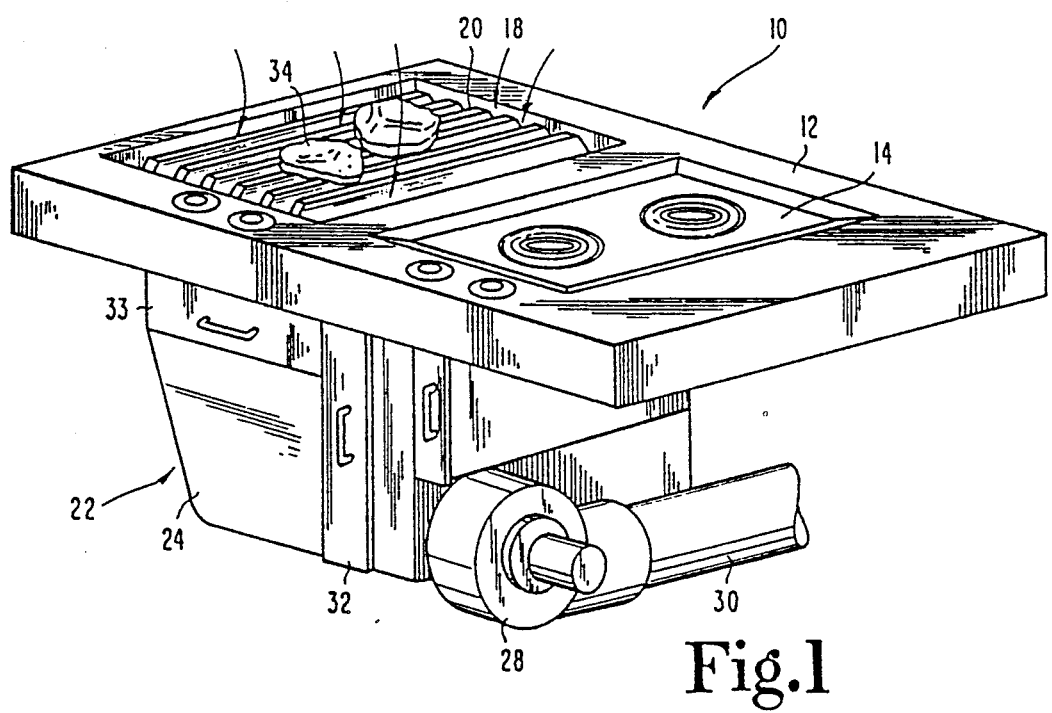
FIG. 1 is a perspective view of a built-in cooking assembly which includes a grill unit exhaust system according to the present invention.

Referring now to the drawings, and in particular to FIG. 1, FIG. 1 shows a cooking device 10 which is adapted according to the present invention and may be built into a kitchen counter (not shown). Cooking device 10 includes a frame 12 which contains a burner section 14 and a grill section or grill unit 18. Burner section 14 may be a conventional burner section and will not be discussed in detail. Grill section or grill unit 18 is an open grill assembly which enables food to be grilled indoors much like being cooked on an outdoor grill. Both burner section 14 and grill unit 18 may be either electric element type or gas fired.

Grill unit 18 includes a plurality of parallel, spaced-apart slats 20 which form an apertured cooking surface. Because such cooking generates cooking gases and other fumes, an exhaust system 22 is provided which gathers and exhausts these cooking gases and fumes before they are permitted to enter the atmosphere around cooking device 10. The exhaust system is preferably activated whenever power is applied to the grill unit. A blower unit 28 is provided which is in venting communication with a plenum chamber 24 in exhaust system 22 and which acts to draw the cooking gases and fumes through plenum chamber 24 and out to the outside atmosphere through an exhaust tube 30. An optional slide-in filter 32 is shown between blower unit 28 and plenum chamber 24. An access door 33 for access to the diverter cartridge of the present invention is present under frame 12 in proximity to grill section 18. To provide access, the door may be hingedly connected in a manner similar to a conventional oven door.

The depiction of the present invention as part of the cooking device of FIG. 1 is intended to be illustrative and not limiting in scope. As a further illustration, the diverter cartridge of the present invention can be used in conjunction with an oven, or gas or electric burner, or all of them or any combination of them. It will be understood that the cooking gases and fumes as well as grease are generated by cooking a selected food item, illustratively indicated as food item 34 in FIG. 1.

Figure 2B:
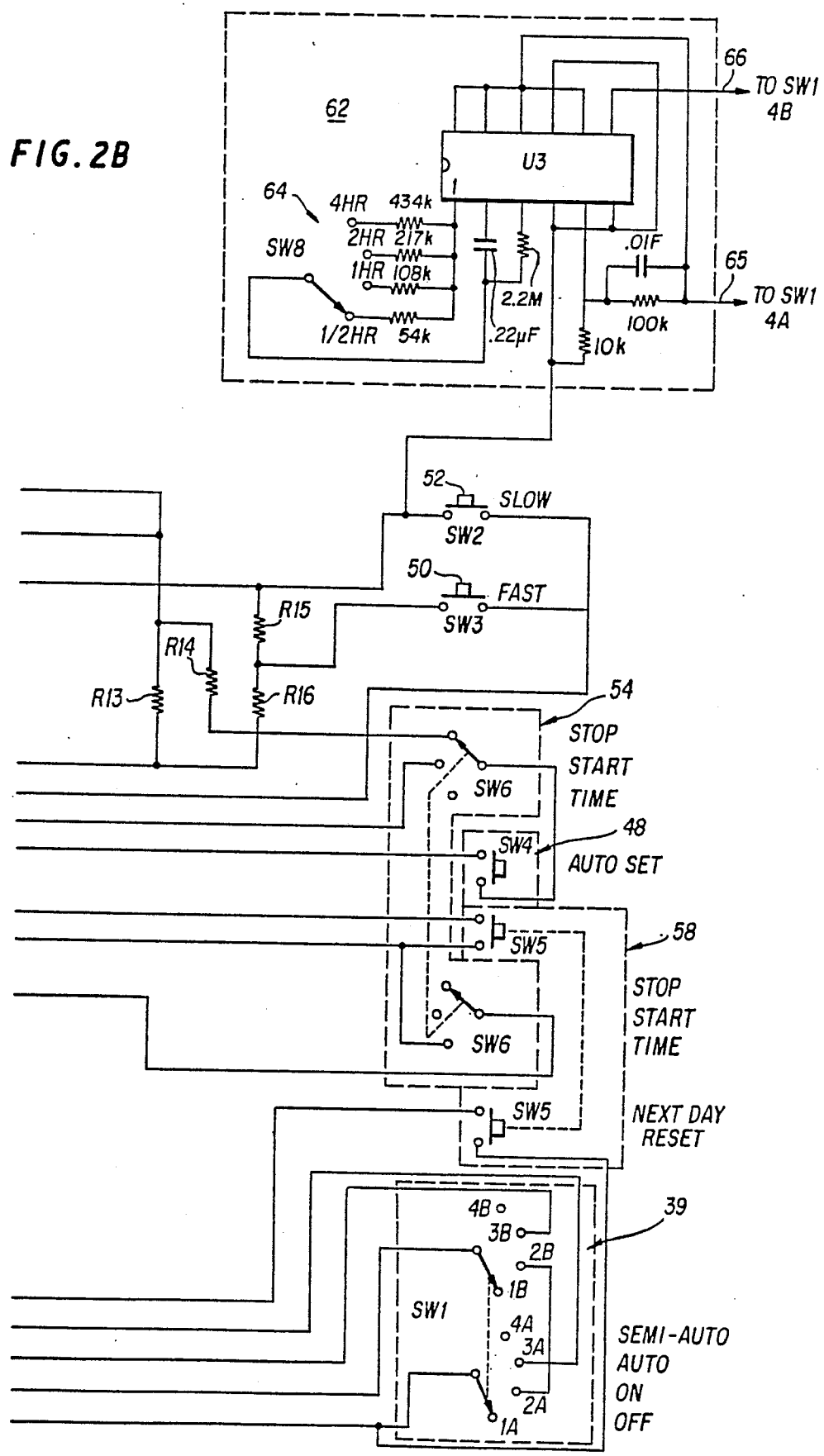
FIG. 2 is a front elevational view of FIG. 1 with portions broken away depicting an exhaust system showing a first alternate embodiment of the present invention.
Figure 2:
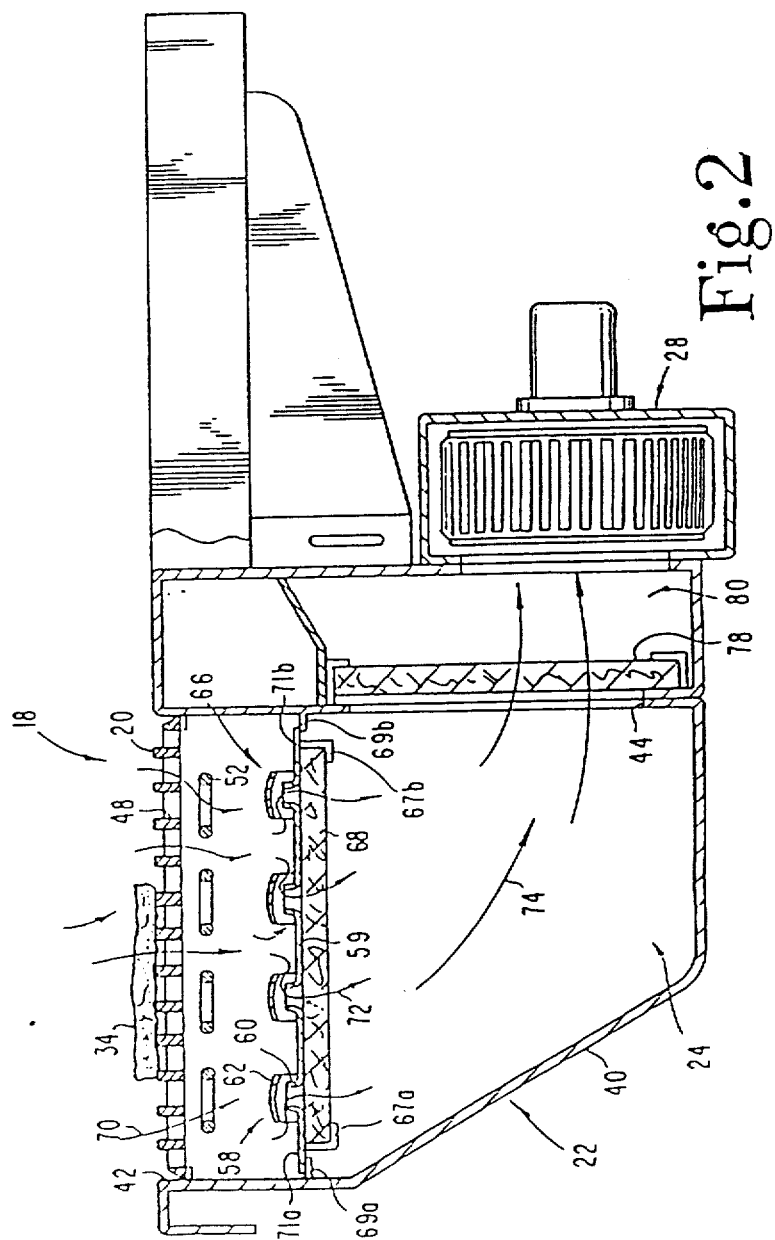
Figure 3:
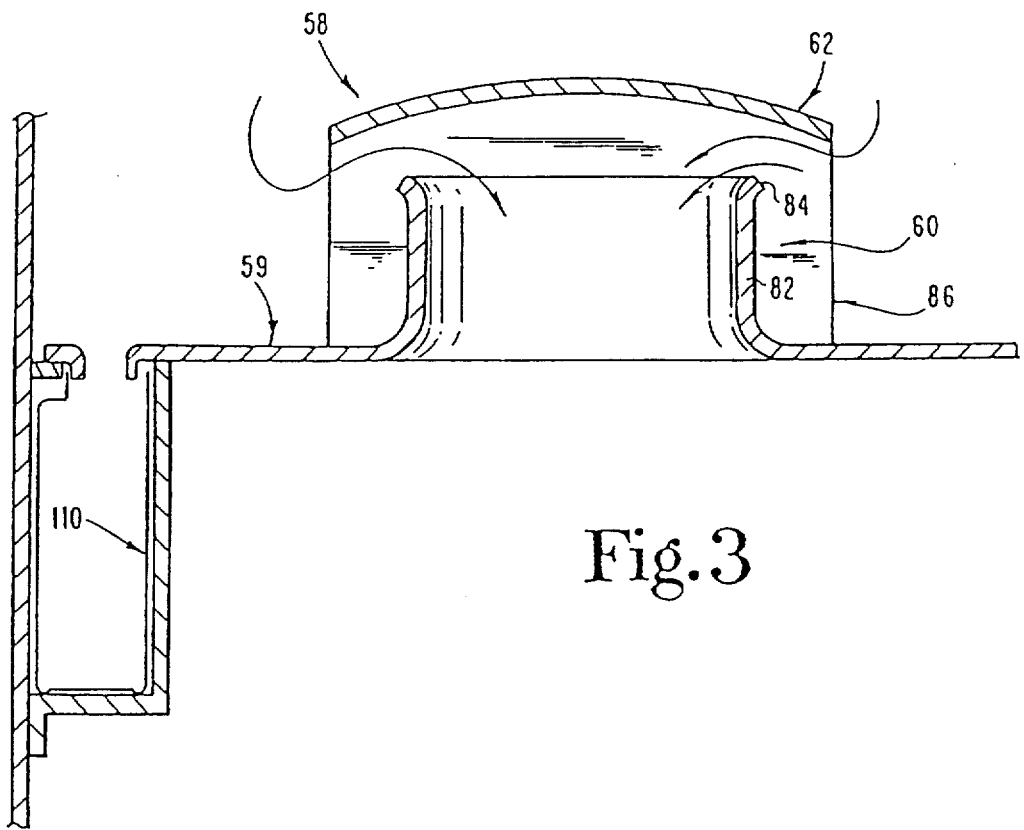

FIG. 2 shows in greater detail grill section 18 and exhaust system 22. Specifically, exhaust system 22 includes a wall 40 which is formed to define an upwardly facing opening 42. Wall 40 also includes a side opening 44 which places blower unit 28 in venting communication with plenum chamber 24.

As discussed above, slats 20 of the cooking surface are in spaced-apart parallel relation such that grill openings or spaces 48 are formed between slats 20. Spaces 48 permit heat generated by a heating element 52 to be transmitted directly to food item 34, and also permit direct venting communication between the cooking surface and plenum chamber 24. By providing direct venting communication between plenum chamber 24 and the top of slats 20, the cooking gases and fumes, as well as any grease or other particles generated by grilling food item 34, are drawn downwardly directly into plenum chamber 24 by blower unit 28. By drawing the cooking gases and fumes directly into plenum chamber 24, the possibility that these cooking gases and fumes, and any associated grease or particles, will collect on kitchen surfaces surrounding cooking device 10 is substantially reduced.

A diverter cartridge 58 according to a first alternate embodiment of the present invention is included in exhaust system 22 and is mounted below heating element 52. Diverter cartridge 58 functions to force the cooking gases and fumes being drawn downwardly into plenum chamber 24 to change direction. In addition, diverter 58 provides collecting surfaces for collecting grease and solid particles contained within the cooking gases and fumes so that the grease and solid particles are separated from the cooking gases and fumes before reaching blower unit 28. Diverter cartridge 58 separates the space within wall 40 into an upper burner chamber 66, including heating element 52 and grill unit 18, and plenum chamber 24. Consequently, the upper generally planar plate 59 of the cartridge acts as a floor for burner chamber 66.

Diverter cartridge 58 includes generally planar plate 59 which is formed to include a plurality of upwardly extending exhaust vents 60. A plurality of dome-like covers 62 are provided, with one cover 62 associated with one exhaust vent 60. The structure and function of covers 62 and exhaust vents 60 will be described in greater detail below. In the alternate embodiment of FIG. 1, a filter element 68 is provided directly below plate 59 and functions to further separate grease and solid particles from the cooking gases and fumes. Cartridge 58 is provided with brackets 67a and 67b for holding filter 68.

It will be understood that diverter cartridge 58 may be completely removed from exhaust system 22 for cleaning or replacement. To facilitate complete removal of diverter cartridge 58, wall 40 includes a pair of inwardly facing and mutually opposed shelves 69a and 69b. Correspondingly, diverter cartridge 58 includes flanges 71a and 71b which rest atop shelves 69a and 69b to slidably retain diverter cartridge 58 within the exhaust system in proximity to the cooking surface. To completely remove the cartridge assembly, access door 33 (FIG. 1) is first opened, exposing diverter cartridge 58. The cartridge assembly is then grasped and pulled in a direction toward the front of cooking device 10 until it is completely removed. Cartridge 58 may then be cleaned, for example by soaking it in hot soapy water or by placing it in a dishwasher. Moreover, removal of cartridge 58 allows access to the component parts of the exhaust plenum and any secondary filters therein. Alternatively, the diverter cartridge 58 may be removed through the top of exhaust system plenum 22 after removal of grills 20 and burners or elements 52.

In operation, cooking gases and fumes generated by grilling a food item 34, are drawn downwardly away from slats 20 and into burner chamber 66 by blower unit 28 as illustrated by arrow 70. It will be understood that these cooking gases and fumes may additionally contain grease and other solid particles. To separate the grease and other solid particles from the cooking gases and fumes 70, diverter cartridge 58 acts to divert the gases and fumes 70 through the tortuous path indicated by the arrow 72. Specifically, the cooking gases and fumes 70 are forced to divert under cover 62 and then through associated exhaust vent 60. By forcing cooking gases and fumes 70 to be so routed, the majority of the contained grease and other solid particles are separated from cooking gases and fumes 70 and collect on and around the surfaces of exhaust vents 60 and cover 62. In addition, filter element 68 acts to further prevent grease and other solid particles from entering plenum 24. After being drawn through an exhaust vent 60 and associated cover 62, and filter element 68, cooking gases and fumes are then drawn directly toward blower unit 28 as indicated by the arrow 74. Before being drawn into blower unit 28, the cooking gases and fumes are optionally forced through a second filter element 78 into cavity 80 before the blower unit 28 forces these gases and fumes to the outside atmosphere through the exhaust tube 30 (FIG. 1).

By placing exhaust system 22 directly below and in direct communication with grill unit 18, enhanced collection and removal of any cooking gases and fumes, as well as any grease is thus accomplished. Additionally, cooking grease and some solid particulate matter may be collected in an optional in-plenum collection system 110 (shown in FIG. 3) after draining from planar plate 59. It will be understood that the plate 59 can be angled somewhat toward the collection system 110 to enhance flow of grease toward the collection system.

Figure 3:
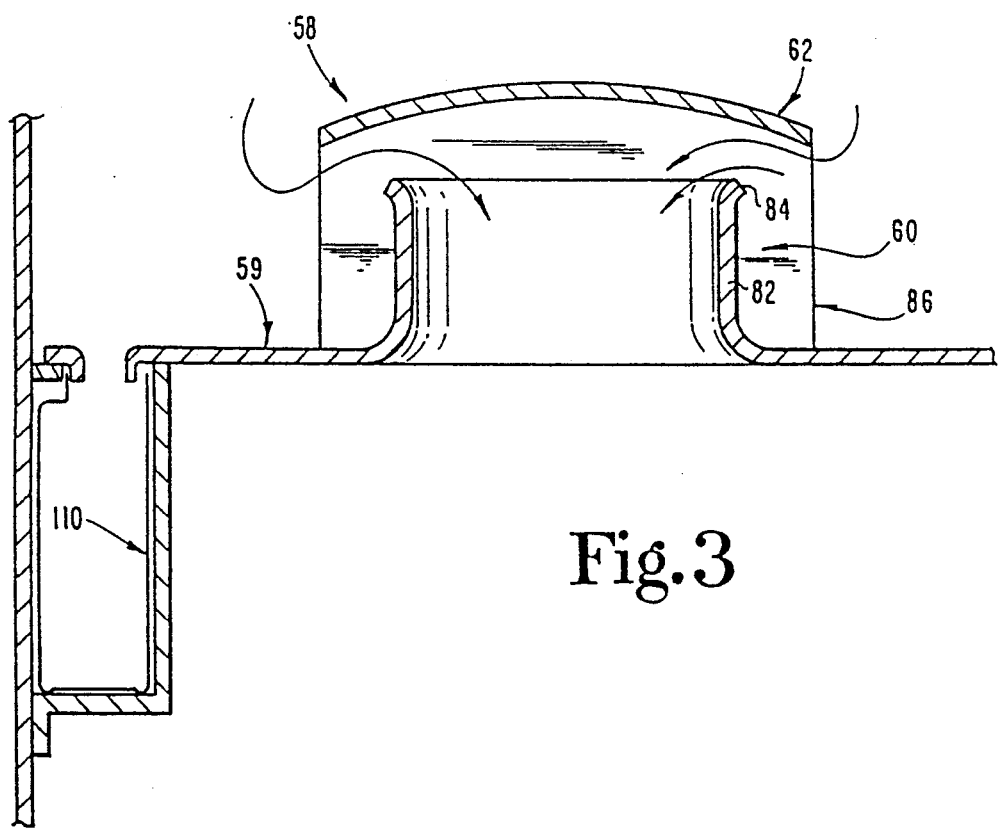
FIG. 3 is a sectional view of one of the exhaust vents and covers of the exhaust system of FIG. 1 showing an optional grease and residue collection system incorporated into the exhaust system.
Figure 1:
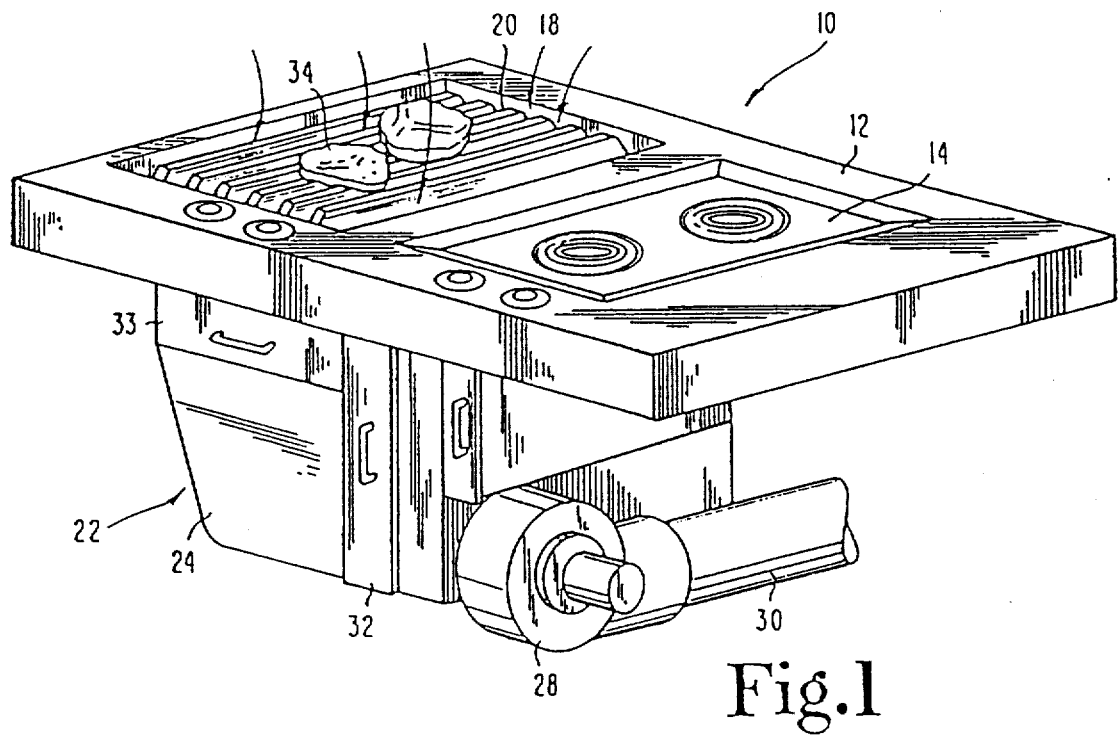

FIG. 3 shows in greater detail the structure of one exhaust vent 60 and its associated cover 62. Specifically, each exhaust vent 60 includes an upstanding wall portion 82 which terminates in an outwardly facing rim portion 84. Associated cover 62 is a dome-shaped cover which is mounted over exhaust vent 60 such that the opening in exhaust vent 60 is completely encompassed by cover 62. A support 86 is provided for mounting cover 62 in its position above and over the exhaust vent 60.

By mounting cover 62 directly over exhaust vent 60 in spaced-apart relation, cooking gases and fumes being drawn directly downwardly from grill unit 18 are forced to change direction substantially ninety degrees in order to divert around cover 62, and then change direction substantially another ninety degrees in order to move downwardly through exhaust vent 60. By forcing the moving cooking gases and fumes to make at least two substantially ninety degree changes in direction, grease and solid particles are separated from the cooking gases and fumes. The surfaces of exhaust vent 60 and cover 62 act to collect this separated grease and solid particles. Specifically, upstanding wall portion 82 of exhaust vent 60 acts to collect a major portion of the separated grease and solid particles. In particular, outwardly facing rim portion 84 acts to collect a substantial portion of the separated grease and solid particles because it extends into the flow path of the moving gases and fumes and provides additional surface area for collection. Exhaust vent 60 may be formed directly in plate 59, or may be fabricated separately and attached to plate 59, either of which will be apparent to those skilled in the art.

Additionally, FIG. 3 illustrates an optional collection system 110 which may be added to collect grease and other solid particulate matter. Collection system 110 utilizes an elongated trough which is placed on one edge of diverter cartridge 58. To enhance grease collection, plate 59 may be angled toward collection system 110. It will be understood that collection system 110 can be constructed in a manner different than that illustrated, so long as it is constructed and oriented to collect grease run-off from diverter cartridge 58.

Figure 4:
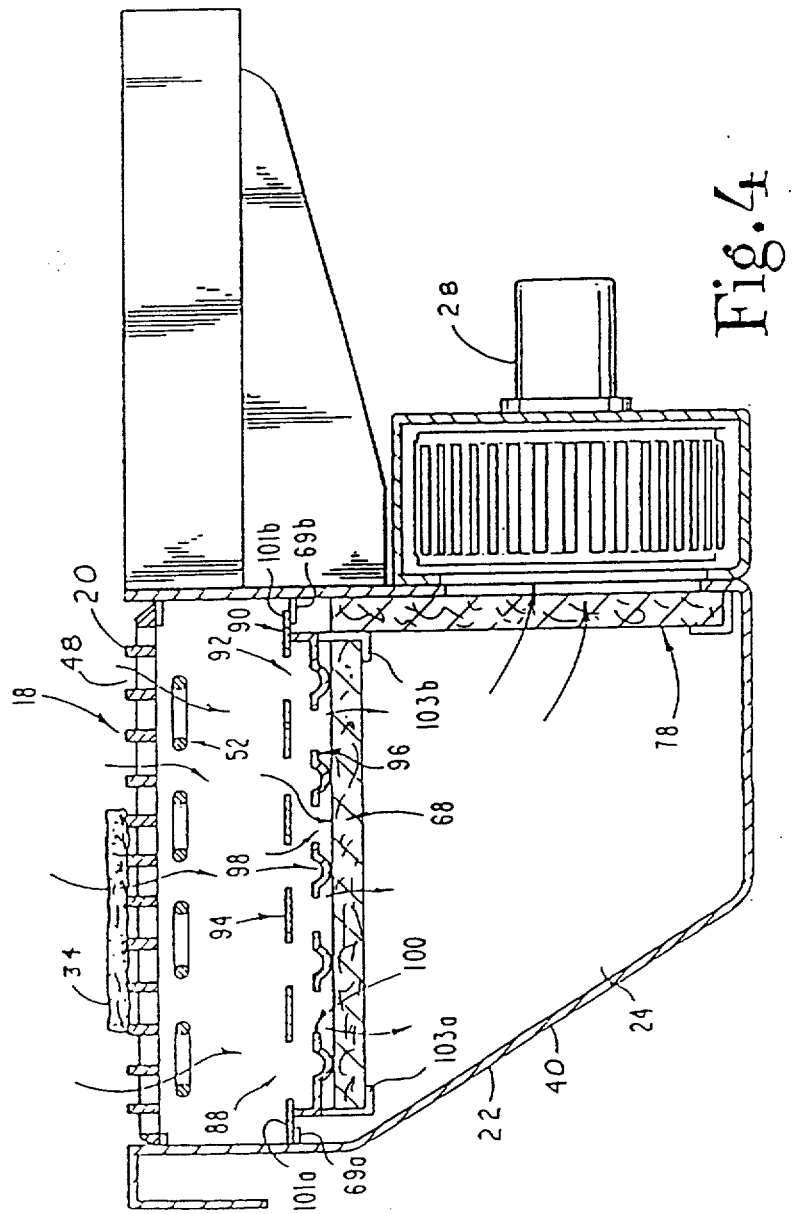
FIG. 4 is a view similar to FIG. 2 showing a second alternate embodiment of the present invention.

FIG. 4 shows a second alternate embodiment of the present invention installed in a slightly modified cooking unit. Specifically, shown is an alternate diverter cartridge 88 slidably mounted on shelves 69a and 69b. In particular, FIG. 4 shows a modified diverter 88 which includes an upper plate 90 formed to include a plurality of longitudinally extending upper slots 92 and cover portions 94. Upper slots 92 are spaced-apart from each other in a regular, parallel relation. A lower plate 96 is disposed below upper plate 90 and includes a plurality of longitudinally extending troughs 98. Lower plate 96 is also formed to include a plurality of longitudinally extending lower slots 100. In the embodiment illustrated in FIG. 4, the number of longitudinally extending troughs 98 is equal to the number of upper slots 92. Upper plate 90 and lower plate 96 are oriented with respect to each other such that upper slots 92 are offset from lower slots 100, while upper slots 92 are in alignment with troughs 98. Spaced-apart cover portions 94 overlap the lower slots 100 in the lower plate 96.

It will be understood that upper cover portions 94 function in a manner similar to covers 62 in the embodiment illustrated in FIG. 2 and lower slots 100 function similar to exhaust vents 60 in the embodiment illustrated in FIG. 2. The cooking gases and fumes must divert around and under cover portions 94 in order to move through lower slots 100. Thus, cover portions 94 and lower slots 100 force the moving gases and fumes to make two substantially ninety degree changes in direction in order to transit diverter cartridge 88. These changes in direction, combined with the surfaces surrounding covers 94 and lower slots 100 separate the grease and other solid particles from the gases and fumes in a manner similar to covers 62 and exhaust vents 60 in the embodiment illustrated in FIG. 2. Additionally, troughs 98, which are aligned with upper slots 92, act to collect additional amounts of grease and other solid particles. Thus, diverter cartridge 88 in this embodiment effectively separates grease and solid particles from the gases and fumes in a manner similar to the diverter assembly 58 of FIG. 2. Any number of lower plates 96 may be utilized as the specific application may require. Additionally, a collection system 110 (FIG. 3) may be included at one end of diverter cartridge 88 to collect grease and solid particulate matter run-off from troughs 98 and lower plates 96.

Like diverter cartridge 58, diverter cartridge 88 and filter element 68 are removable for ease of cleaning and access to exhaust plenum 24. To facilitate complete removal of diverter cartridge 88, wall 40 includes a pair of inwardly facing and mutually opposed shelves 69a and 69b. Correspondingly, diverter cartridge 88 includes flanges 101a and 101b which rest atop shelves 69a and 69b to hold diverter cartridge 88 in its proper place. To completely remove the cartridge assembly, access door 33 (FIG. 1) is first opened, exposing the diverter cartridge 88. The cartridge is then grasped and pulled in a direction toward the front of cooking device 10 until it is completely removed. Cartridge 88 may then be cleaned, for example by soaking it in hot soapy water or by placing it in a dishwasher. Filter 68 may be removed from brackets 103a and 103b for cleaning or replacement. Moreover, removal of catridge 88 allows access to the component parts in the exhaust plenum and any secondary filters 78 therein. Alternatively, diverter cartridge 88 may be removed vertically through the top of plenum chamber 24 following the removal of grills 18 and burner or element 52.

Figure 5:
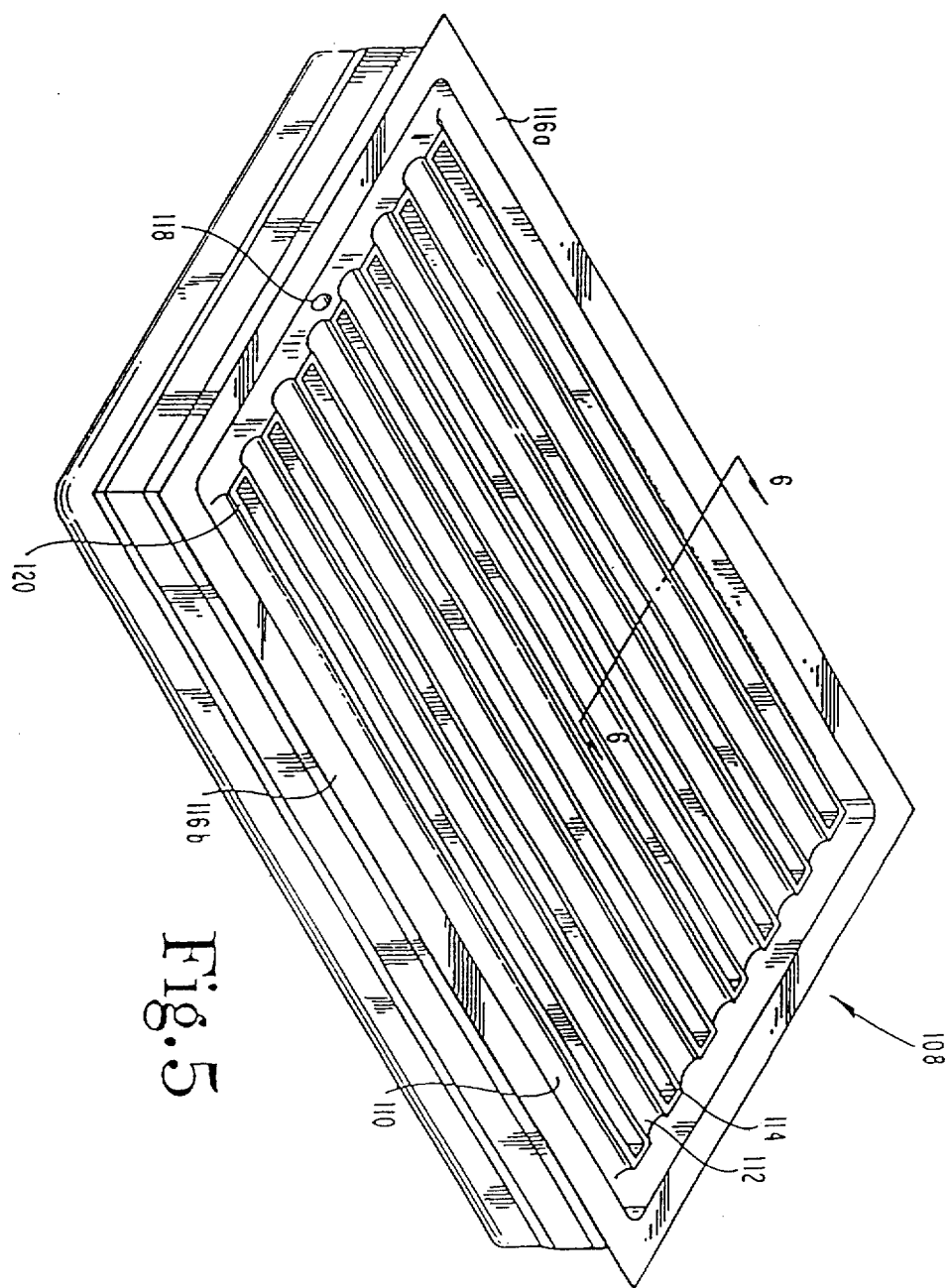
FIG. 5 is a perspective elevational view showing a third alternate embodiment of the present invention.

FIG. 5 is a perspective elevational view of a third alternate embodiment of a diverter cartridge according to the present invention. A diverter cartridge 108 is shown provided with perimeter trough 112 for collecting grease and other solid particulates. Intermediate longitudinal troughs 110 are shown interposed with longitudinal slots 114 through which the cooking gases and fumes are drawn. A drainage hole 118 may be provided at a point along perimeter trough 110. The height of edges 120 defining slots 114 is preferably no greater than the top surface of flanges 116a and 116b for low clearance in removal and replacement.

Figure 6:
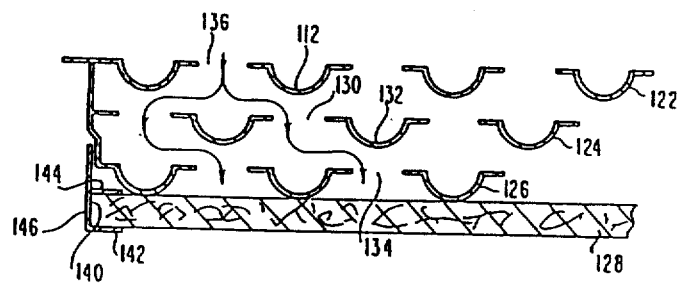
FIG. 6 is a cross section through the embodiment of FIG. 5 taken along line 6—6 of FIG. 5 and looking in direction of arrows.

FIG. 6 is a cross-sectional view of the diverter cartridge shown in FIG. 5 along line 6—6. The cartridge body includes three separator plates 122, 124 and 126 and are shown in combination with lower filter 128. Each plate includes alternating slots and covers similar to lower plate 96 shown in FIG. 3. Each cover forms a trough overlying the slot in the plate below. For example, trough 112 forms a cover for slot 130 while trough 132 forms a cover for slot 134. Air flow is shown by arrows 136.

It will be understood that the troughs function in a manner similar to cover 62 in the embodiment illustrated in FIG. 2 while the slots function similar to slot 60 in the FIG. 2 embodiment. The cooking gases and fumes must divert around and under the troughs 112 of upper plate 122 in order to move through intermediate vents 130. Moreover, the cooking gases and fumes must divert around and under intermediate troughs 132 of intermediate plate 124 in order to pass through slots 134 of lower plate 126. The arrangement of troughs and slots force the moving gases and fumes to make a series of substantially ninety degree changes in direction in order to transit diverter cartridge 108 (FIG. 5). These changes in direction cause rapid oscillation or undulation in the stream of moving gases and fumes and particulates which, when combined with the surfaces surrounding the troughs and slots, efficiently separate the grease and particulates from the gases and fumes in a manner akin to cover 62 and exhaust vent 60 in the embodiment illustrated in FIG. 2. Additionally, the troughs present in each plate, which are aligned with the slots in the plate next above, collect additional amounts of grease and other particulates. Consequently, diverter cartridge 108 of this embodiment effectively separates grease and other particulates from the gases and fumes in the manner similar to that of diverter cartridge 58 of FIG. 2 and diverter cartridge 88 of FIG. 4.

It is understood that any number of plates may be utilized as a specific application may require. Also, the number, location and size of the slots and troughs will be determined by the size of the cooking device and the size of the exhaust plenum. The slots may be located in other arrangements relative to the chamber, cooking elements or cooking surface. Additionally, a collection system 110 (FIG. 3) may be included at one end of diverter cartridge 108 to collect grease and particulate matter run-off from the troughs provided. Alternatively or in addition, grease may be temporarily collected within diverter cartridge 108 until the cartridge is removed for cleaning. By way of example, grease collected from troughs 112 and 110 may run down into the cartridge assembly through drainage hole 118 where it is collected for later removal. Filter 128 is easily removed and replaced or removed for cleaning before replacement. Filter 128 fits easily within groove 140 created by laterally extending tabs 142 and 144 present above and below edge 146 of the filter. The filter is optionally made of a flexible material which may be bent so that the edge 146 thereof is insertable within groove 140 for retention therein. It may be similarly bent for removal.

Cartridge 108 is insertable within plenum 124 as described above in connection with FIGS. 2 and 4. For this reason, cartridge 108 is provided with lateral flanges 116a and 116b which rest on shelves 69a and 69b. Removal of diverter cartridge 108 is also as described above in connection with removal of the first and second alternate embodiments of the present invention. Alternatively, any one of the embodiments may be provided with a handle on the front surface so that the front surface of such diverter cartridge forms a portion of the front surface of cooking device 10.

Figure 7:
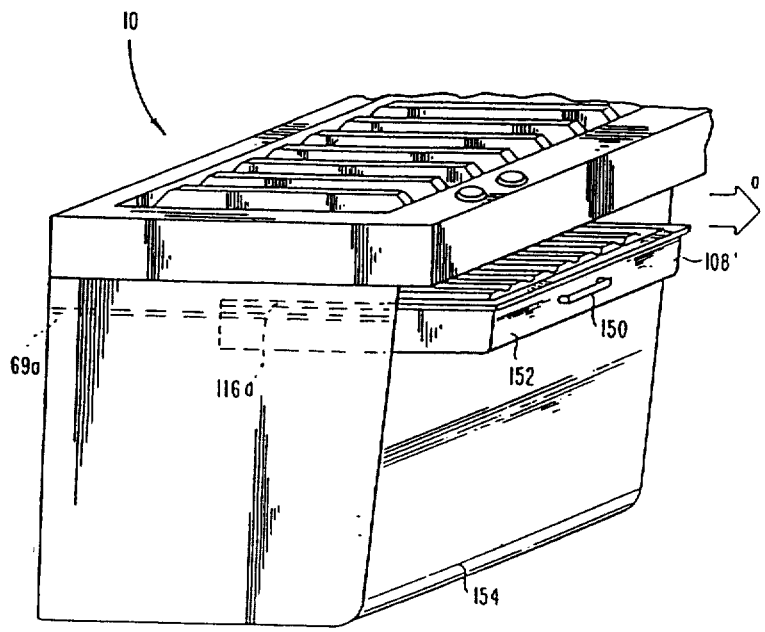
FIG. 7 is a front perspective view of a modification of the embodiment of FIG. 5 shown in place in a cooking device.

FIG. 7 is an example of such a diverter cartridge. Diverter cartridge 108' is shown partially removed from cooking device 10. Diverter cartridge 108' is provided with handle 150 and has a surface 152 which is flush with front surface 154 of cooking device 10 when diverter cartridge 108' is completely replaced within cooking device 10. Door 33 (FIG. 1) is, therefore, unnecessary. In FIG. 7, shelf 69a is shown in phantom as is the rear portion of flange 116a. Diverter cartridge 108' is completely removable from cooking device 10 by forward movement in the direction of arrow A. Force exerted in the direction of arrow A on handle 150 results in diverter cartridge 108' sliding along shelves 69a and 69b (FIG. 4) until the diverter cartridge is completely removed therefrom, or in lieu of handle 150 and surface 152, cartridge 108' may be removed through the top of cooking device 10.

It will be understood that the diverter cartridge according to the present invention may be made according to any of the methods well-known to those skilled in the art. For example, with respect to the embodiment shown in FIG. 6, individual plates 122, 124 and 126 may be formed separately and then welded together to form the cartridge body.

Thus, the present invention provides a direct exhaust system for collecting and exhausting cooking gases and fumes created by cooking on a grill surface which may be utilized indoors. By drawing the gases and fumes downwardly directly through and from the cooking surface, enhanced collection of the gases and fumes, as well as any grease associated with cooking is provided. The collected exhaust residues are then easily disposed of.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A grill exhaust system for directing and exhausting a stream of fumes and particles created by cooking away from an apertured cooking surface comprising:
   a main frame including a plurality of upwardly extending walls defining an exhaust plenum extending therebetween and a top opening for receiving the cooking surface;
   a removable and replaceable flow diverter cartridge insertable in said plenum below the cooking surface and including,
   a cartridge body having sides;
   a flow diverter assembly within said cartridge body for inducing undulation in the exhaust stream including at least two substantially parallel spaced-apart overlying plates, each of said plates defining a plurality of exhaust vents wherein said exhaust vents are staggered relative to said exhaust vents in said substantially parallel plate therebelow and each immediately overlying plate defining a series of spaced covers for said exhaust vent immediately therebelow, said diverter assembly directing the stream downwardly from the cooking surface through said vents while inducing undulation so that the particles are separated from the stream and collect on said assembly while the fumes are exhausted therethrough;
   mutually opposing means provided on said cartridge body;
   supporting means provided on said main frame for removably receiving said mutually opposing means;
   access means for accessing said cartridge for removal from said frame; and
   a fan unit for drawing the fumes downwardly through the apertured cooking surface.

2. The exhaust system of claim 1 wherein said cartridge further includes a filter removable therefrom.

3. The exhaust system of claim 2 wherein said cartridge includes at least one bracket for retaining said filter.

4. The exhaust system of claim 1 wherein said mutually opposing means extends throughout the length of said sides.

5. The exhaust system of claim 1 wherein said covers are trough shaped.

6. The exhaust system of claim 1, and further comprising a collector assembly for collecting accumulated grease and particulate matter, said collector assembly located adjacent the flow diverter assembly and within the exhaust plenum, and wherein said cartridge may be removed vertically through the top of said plenum.

7. The exhaust system of claim 1 wherein said cartridge is slidable relative to said supporting means.

8. In a grill exhaust system with a fan unit directing and exhausting a stream of fumes and particles created by cooking away from an apertured cooking surface and having a main frame defining an exhaust plenum and supporting means, a removable and replaceable flow diverter cartridge insertable in the plenum below the cooking surface comprising:
   a cartridge body;
   a flow diverter assembly within said cartridge body for inducing undulation in the exhaust stream including at least two substantially parallel overlying plates, each of said plates defining a plurality of exhaust vents wherein said exhaust vents are staggered relative to said exhaust vents in said substantially parallel plate therebelow and each immediately overlying plate defining a series of spaced covers for said exhaust vent immediately therebelow, said diverter assembly directing the stream downwardly from the cooking surface through said vents while inducing undulation so that the particles are separated from the stream and collect on said assembly while the fumes are exhausted therethrough; and
   a pair of means resting on the supporting means when said cartridge is placed in the plenum.

9. The cartridge of claim 8, further comprising a filter element underlying said plates, said pair of means slidable relative to the supporting means for removing said cartridge from the plenum.

10. The cartridge of claim 9, further comprising at least one bracket for retaining said filter and wherein said filter is removable from said cartridge.

11. The cartridge of claim 8 wherein said diverter assembly includes at least three substantially parallel plates, said flanges supporting said cartridge on said supporting means with said cartridge vertically removable through the top of the plenum.

12. The cartridge of claim 8 wherein said exhaust vents are formed as slots sized to permit the flow of fumes therethrough.

13. The cartridge of claim 8 wherein said covers are trough shaped.

14. The cartridge of claim 8, further comprising a collector assembly for collecting accumulated grease and particulate matter, the collector assembly located adjacent the flow diverter assembly and within the exhaust chamber.

15. A grill exhaust system for directing and exhausting a stream of fumes and particles created by cooking away from an apertured cooking surface comprising:
   a main frame including a plurality of upwardly extending walls defining an exhaust plenum extending therebetween and a top opening for receiving the cooking surface;
   a removable and replaceable flow diverter cartridge insertable in said plenum below the cooking surface and including,
   a cartridge body having sides;
   a flow diverter assembly within said cartridge body for inducing undulation in the exhaust stream including at least one apertured plate that is formed to include a plurality of apertures and at least one cover forming plate for each aperture maintained in a substantially spaced-apart relation over each aperture to partially obstruct said apertures and direct the stream downwardly from the cooking surface through said apertures while inducing undulation in the stream so that the particles are separated from the stream and collect on said assembly while the fumes are exhausted therethrough;
   first supporting means provided on said cartridge body;
   second supporting means provided on said main frame for removably receiving said first supporting means;
   access means for accessing said cartridge for removal from said frame; and
   a fan unit for drawing the fumes downwardly through the apertured cooking surface.

16. The exhaust system of claim 15 wherein said cartridge includes at least one bracket for retaining said filter.

17. The exhaust system of claim 1 wherein said second supporting means includes a pair of inwardly facing and mutually opposing shelves.

* * * * *

UNITED STATES PATENT AND TRADEMARK OFFICE
CERTIFICATE OF CORRECTION

PATENT NO. : 5,001,970

DATED : March 26, 1991

INVENTOR(S) : James H. Graver

It is certified that error appears in the above-identified patent and that said Letters Patent is hereby corrected as shown below:

The sheet of drawing consisting of FIGS 1 of 6, FIG 2B should be deleted.

The drawings should be renumbered as sheets 1 - 6.

The sheet of drawings consisting of FIGS 6 and 7 should be added as shown on the attached sheet.

Signed and Sealed this

Sixteenth Day of February, 1993

Attest:

STEPHEN G. KUNIN

Attesting Officer

Acting Commissioner of Patents and Trademarks

Pat. No. 5,001,970

UNITED STATES PATENT AND TRADEMARK OFFICE
CERTIFICATE OF CORRECTION

PATENT NO. : 5,001,970  
DATED : March 26, 1991  
INVENTOR(S) : James H. Graver Page 1 of 2

It is certified that error appears in the above-identified patent and that said Letters Patent is hereby corrected as shown below:

The sheet of drawings consisting of FIGS 1 of 6, FIG 2B should be deleted.

The drawings should be renumbered as sheets 1 - 6.

The sheet of drawings consisting of FIGS. 6 and 7 should be added as shown on the attached sheet.

This certificate supersedes Certificate of Correction issued February 16, 1993

Signed and Sealed this

Twenty-second Day of June, 1993

Attest:

MICHAEL K. KIRK

Attesting Officer  Acting Commissioner of Patents and Trademarks